(12) United States Patent
Tondolo (10) Patent No.: US 8,522,818 B2
(45) Date of Patent: Sep. 3, 2013

(54) BOOSTER VALVE

(75) Inventor: Flavio Tondolo, Stezzano BG (IT)

(73) Assignee: STI Srl, Bergamo (IT)

( * ) Notice: Subject to any disclaimer, the term of this patent is extended or adjusted under 35 U.S.C. 154(b) by 515 days.

(21) Appl. No.: 12/414,533

(22) Filed: Mar. 30, 2009

(65) Prior Publication Data

US 2010/0243929 A1 Sep. 30, 2010

(51) Int. Cl.
*F15B 13/02* (2006.01)

(52) U.S. Cl.
USPC .............. 137/596.18; 137/596.2; 251/333

(58) Field of Classification Search
USPC ............... 137/625.66, 627.5, 596.18, 596.2; 251/333; 91/463, 274, 450, 465; 303/28, 303/29, 40
See application file for complete search history.

(56) References Cited

U.S. PATENT DOCUMENTS

| | | | | |
|---|---|---|---|---|
| 2,459,456 A | * | 1/1949 | Rockwell | 137/627.5 |
| 2,489,623 A | * | 11/1949 | Delany | 251/333 |
| 2,910,325 A | * | 10/1959 | Price et al. | 303/40 |
| 2,985,490 A | * | 5/1961 | Gates | 303/40 |
| 3,504,946 A | * | 4/1970 | Valentine et al. | 137/627.5 |
| 3,730,226 A | * | 5/1973 | Nelson | 137/627.5 |
| 3,736,960 A | * | 6/1973 | Cohen | 137/625.66 |
| 3,741,245 A | * | 6/1973 | West | 137/596.18 |
| 3,771,836 A | * | 11/1973 | Bueler | 303/40 |
| 3,788,350 A | * | 1/1974 | West | 137/596.18 |
| 3,907,379 A | * | 9/1975 | Lawson | 303/40 |
| 4,037,879 A | * | 7/1977 | Horowitz | 137/627.5 |
| 4,096,884 A | * | 6/1978 | Horowitz | 137/627.5 |
| 4,117,865 A | * | 10/1978 | Beck | 137/627.5 |
| 4,193,643 A | * | 3/1980 | Knight | 303/40 |
| 4,264,108 A | * | 4/1981 | Bordoni | 303/40 |
| 4,455,051 A | * | 6/1984 | Falk | 303/28 |
| 4,561,464 A | * | 12/1985 | Frantz | 137/596.18 |
| 4,640,309 A | * | 2/1987 | Hoffman et al. | 137/596.18 |
| 4,725,101 A | * | 2/1988 | Szudy et al. | 303/40 |
| 4,794,950 A | | 1/1989 | Gratzmuller | |
| 4,856,851 A | * | 8/1989 | Herring et al. | 303/40 |

(Continued)

FOREIGN PATENT DOCUMENTS

| | | |
|---|---|---|
| DE | 19733773 A1 | 2/1999 |
| EP | 0726511 | 8/1996 |

OTHER PUBLICATIONS

Search Report and Written Opinion for European Patent Application No. EP10158340. May 12, 2011.

*Primary Examiner* — Craig Schneider
*Assistant Examiner* — Minh Le
(74) *Attorney, Agent, or Firm* — Stetina Brunda Garred & Brucker (57) ABSTRACT

A booster valve comprising a housing having a signal port, an actuator port, a supply port, and an exhaust port disposed therein. Disposed within the housing are upper and lower plugs. The upper and lower plugs and the housing collectively define a signal chamber which fluidly communicates with the signal port, an actuator chamber which fluidly communicates with the actuator port, and a supply chamber which fluidly communicates with the supply port. The upper and lower plugs are selectively moveable between neutral, delivery and discharge positions. When in the neutral position, the actuator chamber is fluidly isolated from both the supply chamber and the exhaust port. When in the delivery position, the actuator chamber fluidly communicates with the supply chamber but is fluidly isolated from the exhaust port. Finally, when in the discharge position, the actuator chamber fluidly communicates with the exhaust port but is fluidly isolated from the supply chamber.

20 Claims, 5 Drawing Sheets

(56) References Cited

U.S. PATENT DOCUMENTS

| | | | |
|---|---|---|---|
| 4,979,537 A | | 12/1990 | Offenwanger |
| 5,067,519 A | * | 11/1991 | Russell et al. ............ 137/596.14 |
| 5,261,458 A | * | 11/1993 | Johnson et al. ............. 137/627.5 |
| 5,682,918 A | * | 11/1997 | Stoll et al. .................. 137/627.5 |
| 5,709,246 A | * | 1/1998 | Koelzer ...................... 137/627.5 |
| 5,762,094 A | * | 6/1998 | Hendershot et al. ........ 137/627.5 |
| 5,897,174 A | * | 4/1999 | Ehrlich ....................... 137/627.5 |
| 6,668,848 B2 | | 12/2003 | Lafler et al. |
| 6,935,107 B2 | | 8/2005 | Tondolo |
| 7,147,006 B2 | * | 12/2006 | Shaw et al. ................. 137/627.5 |
| 7,458,310 B2 | | 12/2008 | Junk |

* cited by examiner

BOOSTER VALVE

CROSS-REFERENCE TO RELATED APPLICATIONS

Not Applicable

STATEMENT RE: FEDERALLY SPONSORED RESEARCH/DEVELOPMENT

Not Applicable

BACKGROUND OF THE INVENTION

1. Field of the Invention

The present invention relates generally to fluid flow control devices and, more particularly, to a uniquely configured booster valve for integration into a pneumatic circuit of a valve actuation system.

2. Description of the Related Art

Pneumatic valve actuation systems typically comprise a source of compressed air that is routed through a network of fluid conduits such as pipes. The compressed air is typically provided by an air compressor. The compressed air is routed to a positioner that ultimately controls the flow of compressed air into and out of an actuator. More particularly, the positioner provides a metered flow of compressed air into alternate ends of the actuator in response to a positioner input signal. The actuator may be, for example, a double acting actuator comprising a reciprocating piston sealed within a cylinder. The cylinder of the double acting actuator has a working chamber on each end, with the piston being slidably captured between such chambers. The chambers of the actuator simultaneously receive and exhaust the compressed air as the piston moves back and forth within the cylinder. The piston typically has a shaft which extends from one end of the cylinder, with the shaft being connected to a valve or other component to be moved or actuated in a prescribed manner.

The actuation system moves or strokes the piston by forcing air into a first end of the cylinder while simultaneously exhausting air out of a second end of the cylinder in order to advance the piston in a first direction along the axis of the cylinder. Conversely, the actuation system may also force air into the second end of the cylinder while simultaneously exhausting air out of the first end of the cylinder in order to move the piston along the axis of the cylinder in a second direction opposite the first direction. By driving the air into alternate ends of the cylinder, the piston is moved such that the shaft can be displaced in any position for doing useful work. Actuation systems are commonly used in large scale applications such as in power plants and refineries for controlling system components such as a working valve. In such applications, it may be desirable to repeatedly position the piston to within thousandths of an inch within a very short stroking time. In addition, large scale applications may utilize large volume actuators to react to the high forces that are typical of severe service control valves.

When a large volume actuator is utilized in the pneumatic circuit of the actuation system, the positioner, acting alone, may be unable to supply and exhaust a sufficient volume of compressed air to the actuator within a given time period. As a result, such pneumatic circuits having large volume actuators may be incapable of achieving a quick stroking speed of the piston. In these cases, a known practice in the prior art is to install first and second boosters between the positioner and respective first and second ends of the actuator. When the boosters are integrated into the pneumatic circuit of the actuation system, the positioner typically facilitates the activation of such first and second boosters by providing pneumatic signals in the form of compressed air which is routed thereto. The boosters allow the actuation system to achieve very short stroking times by increasing the flow rate of the positioner to the first end of the cylinder while simultaneously exhausting the second end of the cylinder through a large outlet, or vice-versa. The Cv of the boosters in the exhaust mode is typically greater than the Cv in the supply mode since the exhaust capacity in the pneumatic circuit is typically the controlling factor in determining the stroking time of the piston. The boosters are each connected to the positioner through the use of signal lines, and each receive pneumatic signals via such signal lines, such pneumatic signals being operative to selectively open and close the boosters as needed to regulate the flow of the compressed air into and out of the cylinder in a prescribed manner.

In addition to being connected to the positioner through the use of the signal lines, the boosters are also each connected to the air source and to the actuator through the use larger diameter feed lines. The signal lines are typically of a smaller diameter than the feed lines, some of which supply and exhaust compressed air into and out of the cylinder. When the positioner provides a greater flow of compressed air into the signal lines, such increased pressure or "signal" is sufficient to trigger the boosters such that they are energized. When energized, the boosters allow compressed air to flow from the larger diameter feed lines into and out of the cylinder at a higher flow rate, thereby reducing the stroking time of the piston. As a result, actuator systems including the aforementioned boosters allow the actuator to achieve a relatively fast stroking time if the positioner is capable of providing a flow rate that is high enough to energize the boosters. However, where a low flow rate positioner is utilized, pneumatic circuits operating with large volume actuators may not be able to energize the boosters. Consequently, they suffer the drawback of a slow stroking speed.

However, the benefits to the actuation system that are provided by the addition of the first and second boosters are often accompanied by a performance penalty in the pneumatic circuit of the actuation system. More particularly, the increased number of active components in the pneumatic circuit often gives rise to dynamic instability wherein the piston is difficult to precisely and rapidly position. In this regard, as a result of the increased number of active components attributable to the addition of the boosters, the total requirement of compressed air out of the positioner that is needed in order to effectuate a given piston movement is increased in comparison to pneumatic circuits having a lesser number of active components. Due to the inherently compressible nature of air, the piston may not start to move toward the desired position until the pair of boosters have sufficiently pressurized. Thus, there may be an undesirable lag time between the time that the positioner receives the piston position signal and the time that the piston arrives at the desired position. Also, the piston may overshoot the final position, with overshooting occurring when the piston, moving at a relatively high rate of speed, fails to slow down as it nears the final position such that it moves past the desired position and then must reverse directions. The overshooting of the piston therefore increases the overall lag time of the actuator.

Many of the aforementioned performance penalties in existing actuation systems are attributable to the structural and functional attributes of the boosters integrated into the pneumatic circuit of the actuation system. The present invention alleviates or eliminates such performance penalties by providing a uniquely configured booster valve, a pair of which may be integrated into the pneumatic circuit of an actuation system in the above-described manner. These, and other features and advantages of the present invention, will be described in more detail below.

BRIEF SUMMARY OF THE INVENTION

In accordance with the present invention, there is provided a booster valve comprising a housing having a signal port, an actuator port, a supply port, and an exhaust port disposed therein. Disposed within the housing are upper and lower plugs. The upper and lower plugs and the housing collectively define a signal chamber which fluidly communicates with the signal port, an actuator chamber which fluidly communicates with the actuator port, and a supply chamber which fluidly communicates with the supply port. The upper and lower plugs are selectively moveable between neutral, delivery and discharge positions. When in the neutral position, the actuator chamber is fluidly isolated from both the supply chamber and the exhaust port. When in the delivery position, the actuator chamber fluidly communicates with the supply chamber but is fluidly isolated from the exhaust port. Finally, when in the discharge position, the actuator chamber fluidly communicates with the exhaust port but is fluidly isolated from the supply chamber.

The present invention is best understood by reference to the following detailed description when read in conjunction with the accompanying drawings.

BRIEF DESCRIPTION OF THE DRAWINGS

These, as well as other features of the present invention, will become more apparent upon reference to the drawings wherein.

Common reference numerals are used throughout the drawings and detailed description to indicate like elements.

DETAILED DESCRIPTION OF THE INVENTION

Figure 1:
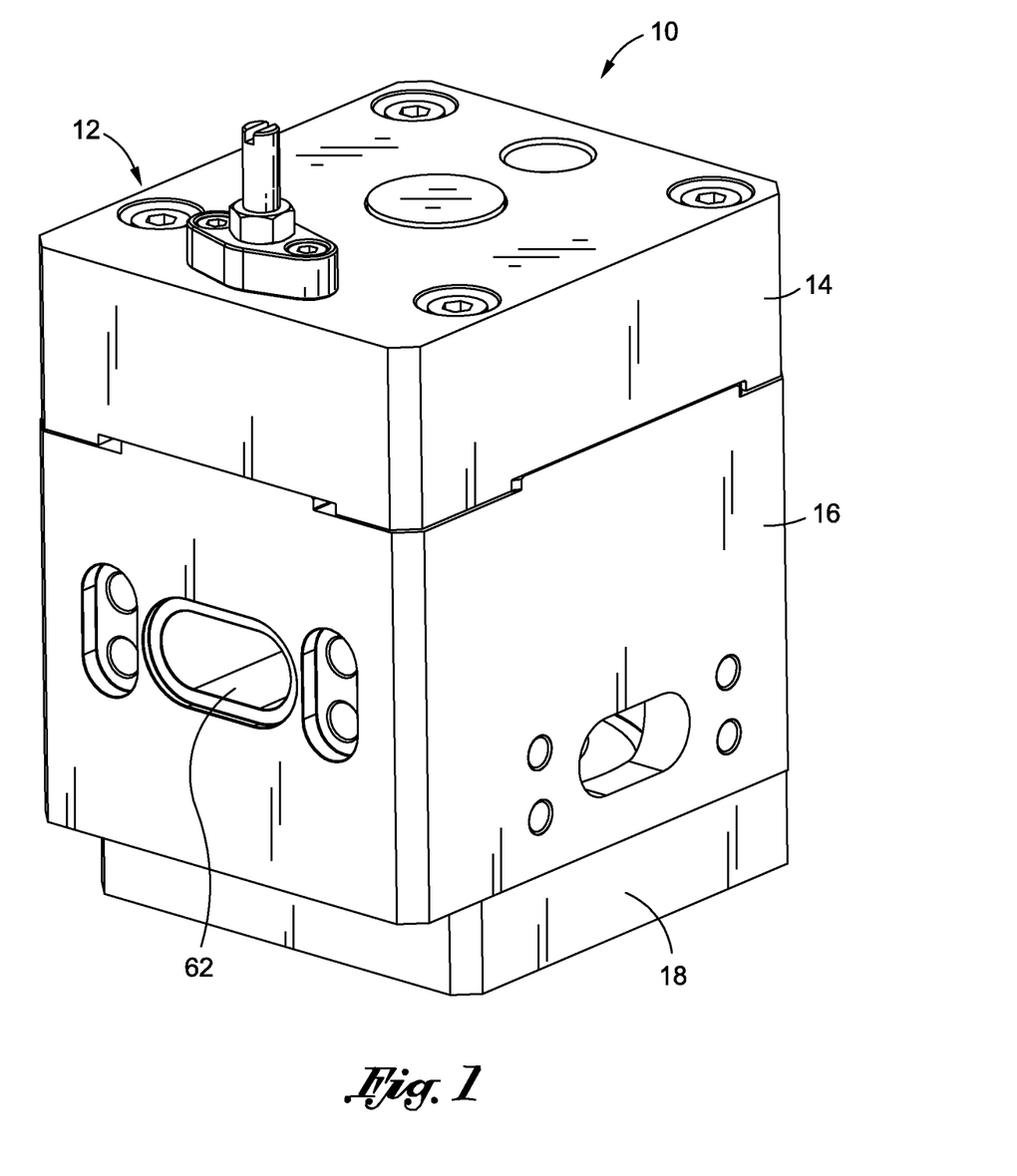
FIG. 1 is a perspective view of a booster valve constructed in accordance with the present invention.
Figure 2:
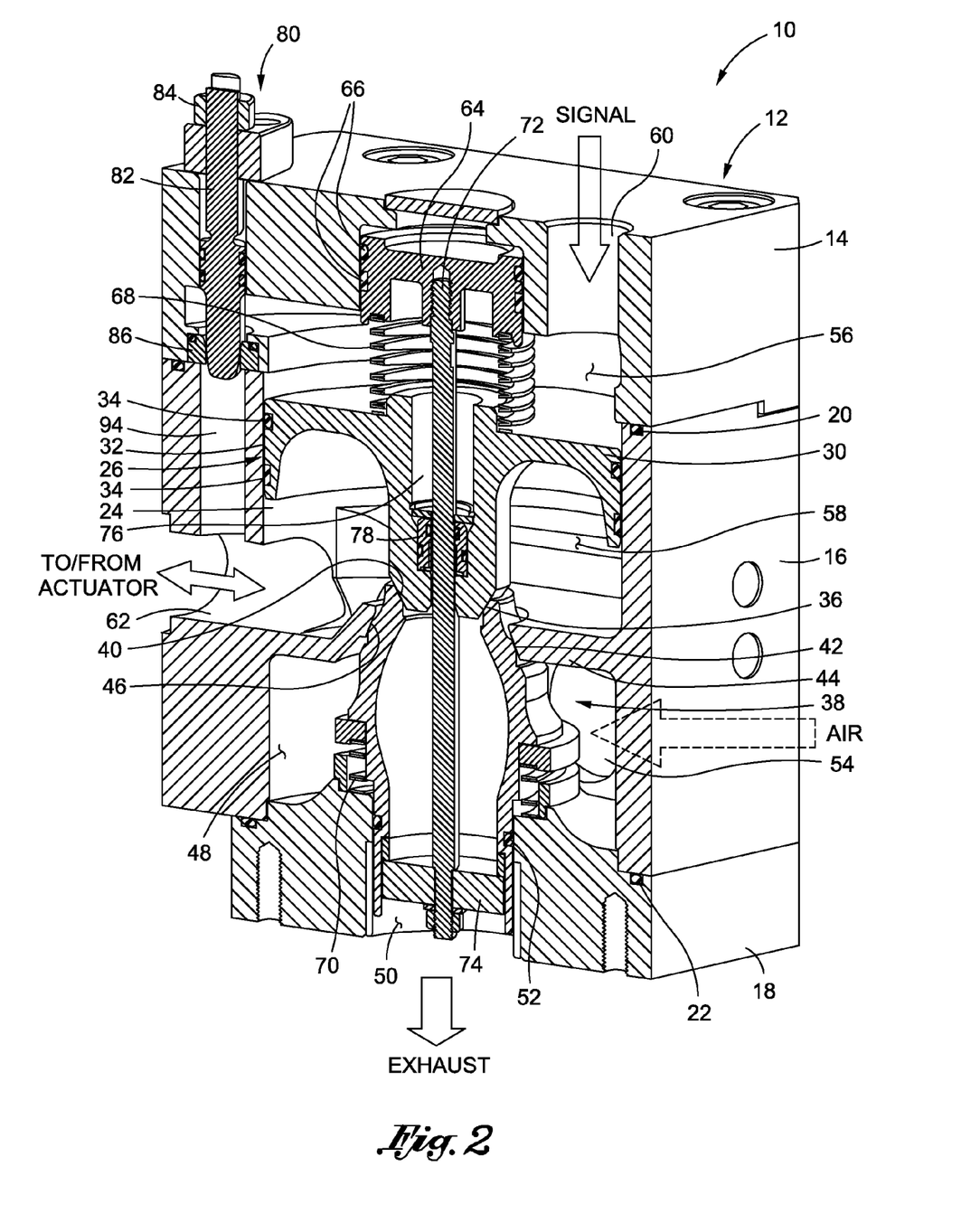
FIG. 2 is a cross-sectional, perspective view of the booster valve shown in FIG. 1, illustrating the booster valve in a neutral, no pressure position.
Figure 3:
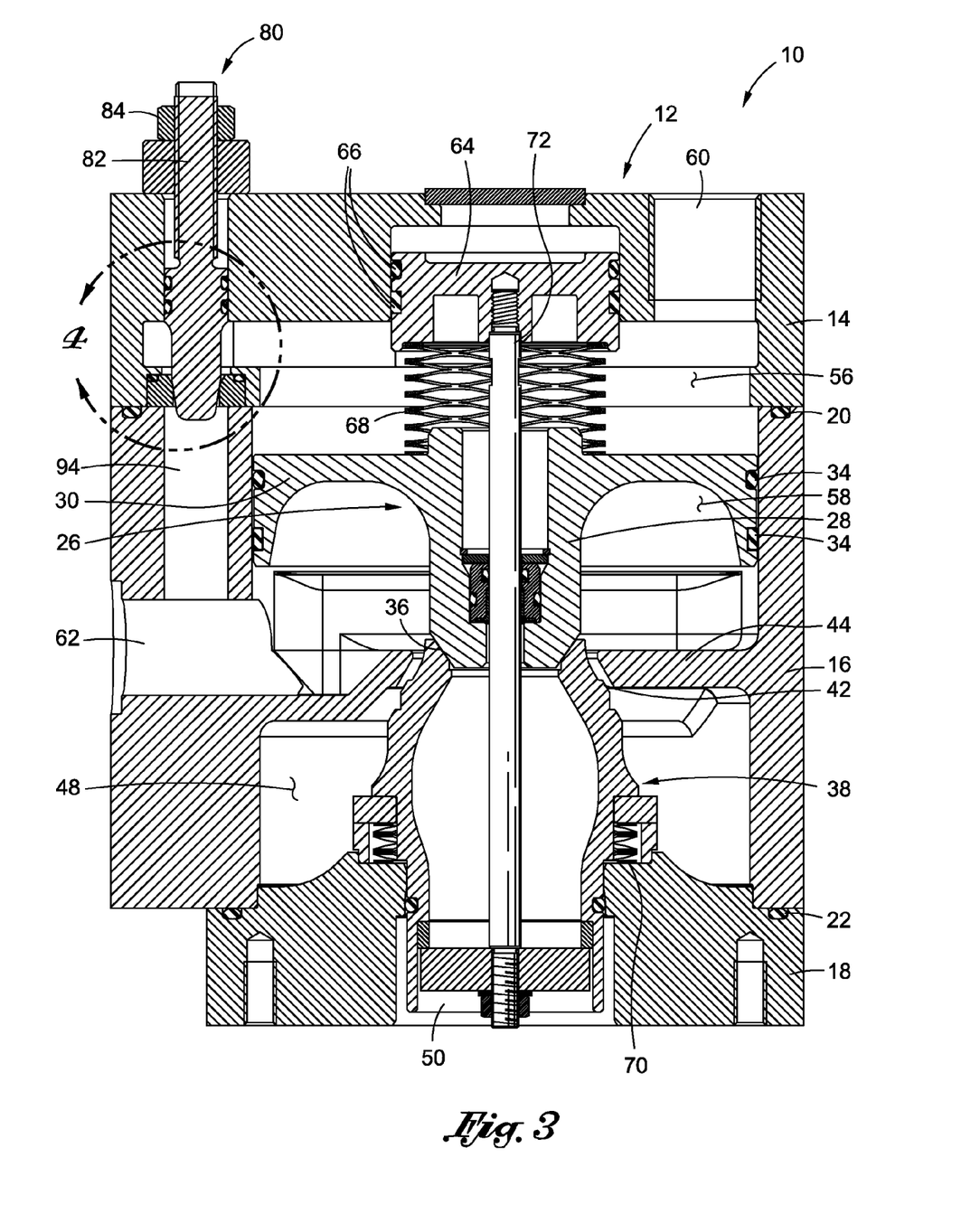
FIG. 3 is a cross-sectional view of the booster valve shown in FIG. 1, but illustrating the booster valve in a delivery position.

Referring now to the drawings wherein the showings are for purposes of illustrating a preferred embodiment of the present invention only, and not for purposes of limiting the same, FIG. 1 perspectively illustrates a booster valve 10 constructed in accordance with the present invention. In FIG. 2, the booster valve 10 is depicted in a neutral, no pressure position. In FIG. 3, the booster valve 10 is depicted in a delivery position, while in FIG. 5, the booster valve 10 is depicted in a discharge position. The structural and functional attributes of the booster valve 10 when in the neutral, delivery and discharge positions will be described in more detail below.

Figure 5:
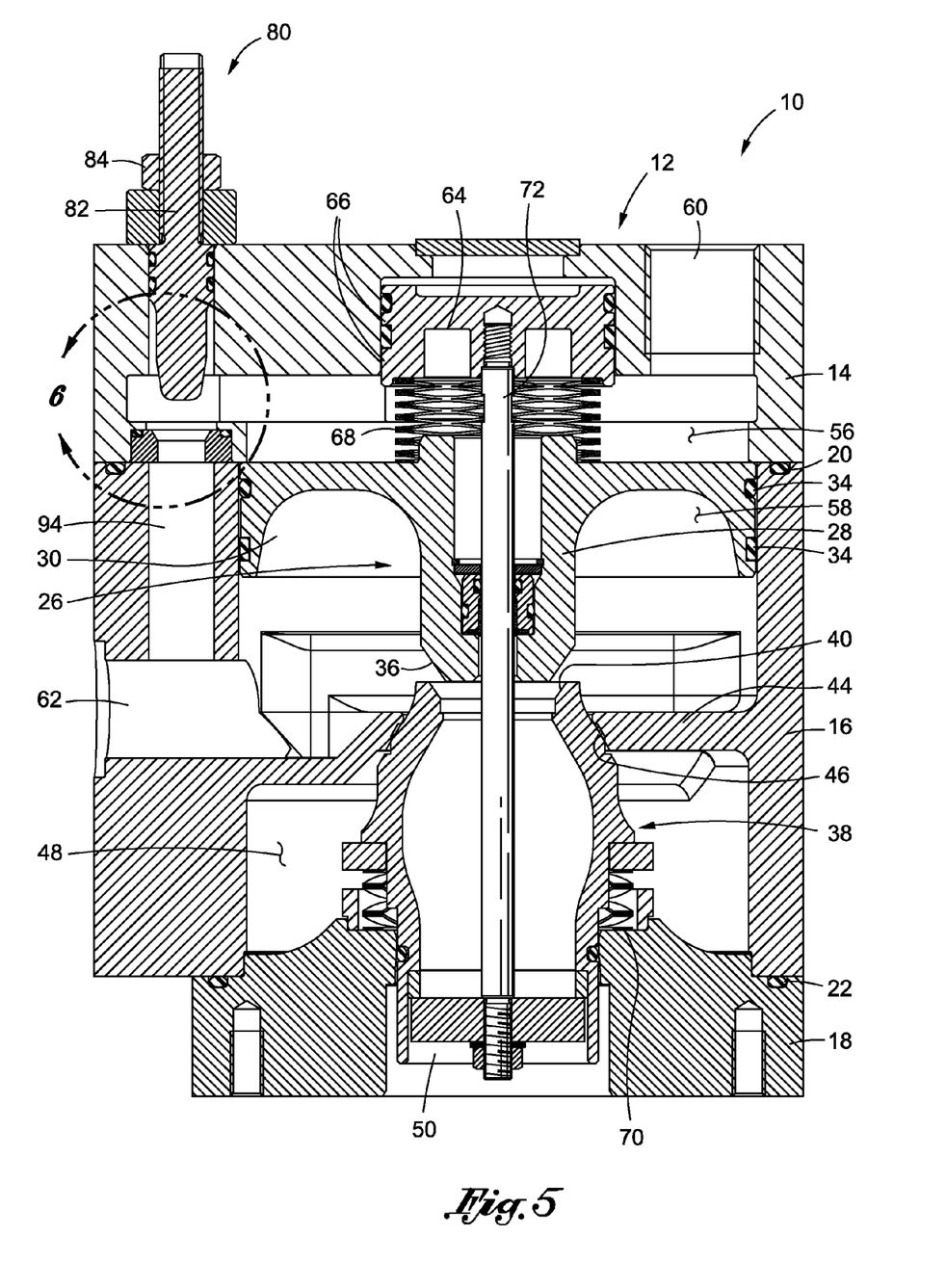
FIG. 5 is a cross-sectional view of the booster valve shown in FIG. 1, but illustrating the booster valve in a discharge position rather than the delivery position.

The booster valve 10 comprises a housing 12 which has a generally cubic configuration. As viewed from the perspective shown in FIGS. 2, 3 and 5, the housing 12 includes a first (upper) section 14, a second (middle) section 16, and a third (lower) section 18. The second section 16 is effectively captured between the first and third sections 14, 18. As seen in FIGS. 2, 3 and 5, an O-ring 20 is preferably captured between the first and second sections 14, 16 to facilitate the creation of a fluid-tight seal therebetween. Similarly, an O-ring 22 is preferably captured between the second and third section 16, 18 to facilitate the formation of a fluid-tight seal therebetween. In the booster valve 10, it is contemplated that the first, second and third sections 14, 16, 18 of the housing 12 will be rigidly secured to each other through the use of fasteners such as bolts, thus allowing such first, second and third sections 14, 16, 18 to be selectively separated from each other as may be needed to access various internal components of the booster valve 10 for maintenance purposes, such internal components being described with particularity below. However, those of ordinary skill in the art will recognize that the present invention is not intended to be limited to any specific modality for facilitating the attachment of the first, second and third sections 14, 16, 18 of the housing 12 to each other. The housing 12 collectively defined by the first, second and third sections 14, 16, 18 is generally hollow and, together with other components of the booster valve 10, defines various internal chambers which will also be described in more detail below.

As further seen in FIGS. 2, 3 and 5, the second section 16 of the housing 12 defines a circularly configured inner wall 24. Disposed within the interior of the second section 16 is an upper plug 26 of the booster valve 10. The upper plug 26 defines a central, generally tubular hub portion 28 and a generally circular flange portion 30 which extends radially from the hub portion 28 in close proximity to one of the opposed ends thereof. The flange portion 30 of the upper plug 26 defines a peripheral outer surface 32 having a pair of continuous grooves formed therein and extending in spaced, generally parallel relation to each other. Disposed within each of the grooves within the outer surface 32 of the flange portion 30 are respective ones of a pair of sealing members 34. In the booster valve 10, the outer surface 32 of the flange portion 30 of the upper plug 26 is adapted to slidably move along the inner wall 24 of the second section 16 in a reciprocal fashion, with the sealing members 34 effectively maintaining a fluid tight seal between the flange portion 30 and the inner wall 24 (and hence between the upper plug 26 and the second section 16) despite the movement of the outer surface 32 of the flange portion 30 along the inner wall 24. As best seen in FIG. 2, the hub portion 28 of the upper plug 26 defines a tapered sealing surface 36 which extends to that end thereof disposed furthest from the flange portion 30. The use of the sealing surface 36 of the upper plug 26 will be described in more detail below.

In addition to the upper plug 26, the booster valve 10 includes a tubular, hollow lower plug 38, a portion of which normally resides within the interior of the second section 16 of the housing 12, and a portion of which normally resides within the interior of the third section 18 of the housing 12. The lower plug 38 defines a tapered sealing surface 40 which extends to one end thereof. The sealing surface 40 is complimentary to and adapted to selectively engage the sealing surface 36 of the upper plug 26 in a manner which will be described in more detail below as well. In addition to the sealing surface 40, the lower plug 38 defines an arcuate, generally convex sealing surface 42 which extends continuously about the outer surface thereof in relative close proximity to that end of the lower plug 38 to which the sealing surface 40 extends. The use of the sealing surface 42 will also be described in more detail below.

In the housing 12 of the booster valve 10, the second section 16, in addition to defining the inner wall 24 described above, further defines an internal partition wall 44 which defines a circular, tapered sealing surface 46. In this regard, as best seen in FIG. 2, the sealing surface 46 of the partition wall 44 forms a central opening therein, with a portion of the lower plug 38 normally protruding through such central opening. In the booster valve 10, an air supply chamber 48 is collectively defined by the second and third section 16, 18 of the housing 12, with the upper end of the air supply chamber 48 (when viewed from the perspective shown in FIGS. 2, 3 and 5) being defined or bounded by the partition wall 44 of the second section 16.

In the booster valve 10, a large portion of the lower plug 38 normally resides within the air supply chamber 48 in the manner shown in FIGS. 2, 3 and 5. In addition, a portion of the lower plug 38 (i.e. a lower portion when viewed from the perspective shown in FIGS. 2, 3 and 5) normally resides within an exhaust port 50 disposed within the third section 18 of the housing 12. The exhaust port 50 does not fluidly communicate directly with the air supply chamber 48, but rather fluidly communicates with the hollow interior of the lower plug 38 via the open end of the lower plug 38 which is opposite the open end to which the aforementioned sealing surface 40 of the lower plug 38 extends. The lower plug 38 is slidably movable within the exhaust port 50 in a reciprocal fashion. In this regard, disposed within the outer surface of the lower plug 38 is a continuous groove or channel having a sealing member such as an O-ring 52 disposed therein. The O-ring 52 or other sealing member is adapted to maintain a fluid tight seal between the outer surface of the lower plug 38 and the complimentary surface of the third section 18 defining the exhaust port 50, despite the sliding, reciprocal movement of the lower plug 38 relative to the third section 18. Thus, air within the air supply chamber 48 is effectively prevented from flowing between the lower plug 38 and the third section 18 of the housing 12 into the exhaust port 50. The third section 18 also preferably includes an air supply port 54 disposed therein and fluidly communicating with the air supply chamber 48. The use of the air supply port 54 will be discussed in more detail below.

In the booster valve 10, the inclusion of the upper plug 26 within the second section 16 of the housing 12 effectively facilitates the formation of a signal chamber 56 and a separate actuator chamber 58 within the interior of the housing 12, which are in addition to the above-described air supply chamber 48. The signal chamber 56 is collectively defined by portions of the upper plug 26 and the first and second sections 14, 16 of the housing 12. More particularly, when viewed from the perspective shown in FIGS. 2, 3 and 5, the upper end of the signal chamber 56 is defined or bounded by the first section 14 of the housing 12, with the lower end of the signal chamber 56 being defined or bounded predominantly by the flange portion 30 of the upper plug 26. The actuator chamber 58 is collectively defined by the upper plug 26 and the second section 16 of the housing 12, with the upper end of the actuator chamber 58 when viewed from the perspective shown in FIGS. 2, 3 and 5 being defined or bounded by the flange portion 30 of the upper plug 26, and the lower end of the actuator chamber 58 being defined or bounded by the partition wall 44 of the second section 16 of the housing 12. As will be recognized by those of ordinary skill in the art, since the upper plug 26 is adapted to be reciprocally movable within the interior of the housing 12 (and in particular along the inner wall 24) as indicated above, the internal volumes of the signal and actuation chambers 56, 58 are not fixed or constant, but rather will vary (i.e., be slightly increased or decreased) depending upon the particular position of the upper plug 26 relative to the housing 12 as will also be discussed in more detail below.

In the booster valve 10, disposed within the first section 14 of the housing 12 is a signal port 60 which fluidly communicates with the signal chamber 56. Additionally, disposed within the second section 16 of the housing 12 is an actuator port 62 which fluidly communicates with the actuator chamber 58. As indicated above, portions of the lower plug 38 normally reside within the air supply chamber 48 and the exhaust port 50, with a portion of the lower plug 38 also normally residing within and extending through the opening defined by the partition wall 44 of the second section 16. In this regard, that end of the lower plug 38 to which the sealing surface 40 extends (which is opposite the end communicating with the exhaust port 50) normally resides within the actuator chamber 58.

Operatively coupled to the first section 14 of the housing 12 is a spring retention collar 64. More particularly, as seen in FIGS. 2, 3 and 5, the spring retention collar 64, which has a generally cylindrical configuration, partially resides within a complimentary, cylindrically configured recess defined by the first section 14. Disposed within the outer surface of the spring retention collar 64 is a pair of continuous channels or grooves which extend in spaced, generally parallel relation to each other. Disposed within each of these grooves are respective ones of a pair of sealing members 66. The spring retention collar 64 is slidably movable within the complimentary recess within the first section 14 in a reciprocal fashion for reasons which will be discussed in more detail below. The sealing members 66 within the spring retention collar 64 are adapted to maintain a fluid tight seal between the outer surface of the spring retention collar 64 and the complimentary surface of the first section 14 partially defining the recess therein, despite the sliding, reciprocal movement of the spring retention collar 64 relative to the first section 14. Thus, any air entering the signal chamber 56 via the signal port 60 is effectively prevented from flowing between the spring retention collar 64 and the first section 14.

The booster valve 10 further comprises an upper spring 68 which is effectively captured between the spring retention collar 64 and the upper plug 26. More particularly, the upper spring 68 resides within the signal chamber 56, with one end of the upper spring 68 being abutted against the spring retention collar 64, and the opposite end of the upper spring 68 being abutted against the top surface of the flange portion 30 of the upper plug 26 when viewed from the perspective shown in FIGS. 2, 3 and 5. In addition to being abutted against the flange portion 30, that end of the upper spring 68 opposite the end abutted against the spring retention collar 64 also circumvents a small section of the hub portion 28 of the upper plug 26 which protrudes from the top surface of the flange portion 30 thereof. As will be described in more detail below, the upper spring 68 normally biases the upper plug 26 toward the lower plug 38.

In addition to the upper spring 68, the booster valve 10 comprises a lower spring 70 which resides within the air supply chamber 48. As seen in FIGS. 2, 3 and 5, one end of the upper spring 68 is abutted against a complimentary shoulder defined by the lower plug 38, with the remaining, opposite end of the lower spring 70 being abutted against the third section 18 of the housing 12. Thus, the lower spring 70 is operative to normally bias the lower plug 38 toward the upper plug 26 and, more particularly, to bias the sealing surface 42 defined by the lower plug 38 into sealed engagement with the complimentary sealing surface 46 defined by the partition wall 44 of the second section 16 of the housing 12.

In the booster valve 10, the above-described spring retention collar 64 is operatively coupled or attached to the lower plug 38. Such attachment is facilitated by an elongate stem 72, one end portion of which is rigidly attached to the spring retention collar 64. The remaining, opposite end portion of the stem 72 is attached to a spoke-like support member 74 which resides within the hollow interior of the lower plug 38 and is rigidly attached to the inner surface thereof in close proximity to that end of the lower plug 38 residing within the exhaust port 50. Thus, in addition to extending axially through the lower plug 38, the stem 72 further extends axially through the hub portion 28 of the upper plug 26 in the manner shown in FIGS. 2, 3, and 5. Due to its structural attributes, the support member 74 defines a plurality of flow openings.

In the booster valve 10, the upper plug 26 is not rigidly attached to the stem 72, but rather is slidably positionable along the stem 72. In this regard, the hub portion 28 of the upper plug 26 defines a passage 76 extending axially therethrough. A portion of the passage 76 which extends to that end of the upper plug 26 to which the sealing surface 42 extends is of a first diameter, with the remainder of the passage 76 being of a second diameter which exceeds the first diameter. The aforementioned first diameter of the passage 76 slightly exceeds the outer diameter of the stem 72, such that the stem 72 is slidably advanceable through the first diameter section of the passage 76. Disposed within the increased diameter second section of the passage 76 is a seal packing 78 which circumvents a portion of the stem 72, and is effectively captured between the stem 72 and a portion of that surface of the hub portion 28 of the upper plug 26 which defines the second section of the passage 76. The use of the seal packing 78 will also be described in more detail below.

Figure 4:
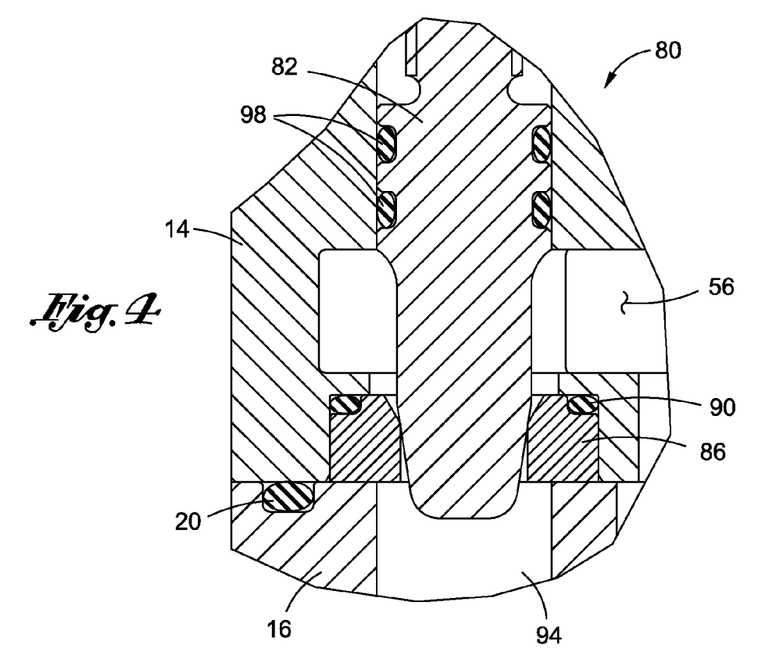
FIG. 4 is an enlargement of the circled region 4 shown in FIG. 3, illustrating the bypass adjustment of the booster valve in a closed position.
Figure 6:
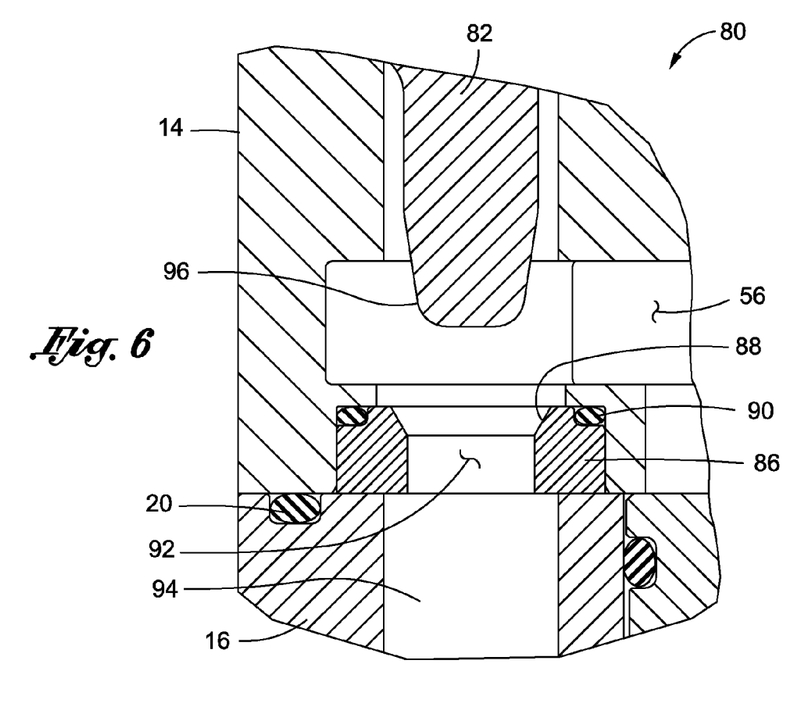
FIG. 6 is an enlargement of the encircled region 6 shown in FIG. 5, illustrating the bypassed adjustment in an open position.

In addition to the above-described components, the booster valve 10 further comprises a bypass adjustment mechanism 80, portions of which are shown with particularity in FIGS. 4 and 6. The bypass adjustment mechanism 80 comprises a bypass plug 82 which extends through a complimentary opening disposed within the first section 14 of the housing 12. One end portion of the bypass plug 82 protrudes from an exterior surface of the first section 14, and has an adjustment member 84 operatively coupled thereto.

The bypass adjustment mechanism 80 further comprises an annular sealing ring 86 which is operatively captured between the first and second sections 14, 16 of the housing 12. The sealing ring 86 defines a tapered sealing surface 88 which extends about the inner periphery of one end thereof. Additionally, disposed within the end of the sealing ring 86 to which the sealing surface 88 extends is a continuous channel or groove having a sealing member such as an O-ring 90 disposed therein. As seen in FIGS. 4 and 6, the O-ring 90 is effectively compressed between the sealing ring 86 and the first section 14 of the housing 12. In the sealing ring 86, the sealing surface 88 circumvents and defines one end of a flow passage 92 which extends axially through the sealing ring 86. In the booster valve 10, the flow passage 92 is itself coaxially aligned with a bypass conduit 94 which extends through the second section 16 of the housing 12. One end of the bypass conduit 94 fluidly communicates with the actuator port 62, with the opposite end thereof fluidly communicating with the flow passage 92 of the sealing ring 86.

In the booster valve 10, the bypass plug 82 of the bypass adjustment mechanism 80 is selectively moveable between a closed position (shown in FIGS. 2 and 4) and a fully open position (shown in FIG. 6). When the bypass plug 82 is in its closed position, a tapered sealing surface 96 defined by the bypass plug 82 is brought into sealed engagement with the complimentary sealing surface 88 defined by the sealing ring 86, in the manner shown in FIGS. 2 and 4. Additionally, when the bypass plug 82 is in its closed position, a portion thereof extends completely through the flow passage 92 of the sealing ring 86, and protrudes slightly into the bypass conduit 94. Conversely, when the bypass plug 82 is moved to its fully open position shown in FIG. 6, the sealing surface 96 of the bypass plug 82 is completely separated from the sealing surface 88 of the sealing ring 86, thus placing the flow passage 92 of the sealing ring 86 into fluid communication with the signal chamber 56 of the housing 12. Thus, the movement of the bypass plug 82 from its closed position shown in FIG. 4 to any open position including the fully open position shown in FIG. 6 creates an open fluid path between the signal chamber 56 and the actuator port 62 via the flow passage 92 and bypass conduit 94. Though the bypass plug 82 is shown at the extreme limit of its open position in FIG. 6, those of ordinary skill in the art will recognize that any movement of the bypass plug 82 relative to the sealing ring 86 as results in a separation of the sealing surfaces 88, 96 from each other constitutes movement of the bypass plug 82 to an open position.

Despite the inclusion of the bypass adjustment mechanism 80 in the booster valve 10, air within the signal chamber 56 is prevented from escaping between the bypass plug 82 and the first section 14 to the exterior of the housing 12. In this regard, disposed within the outer surface of the bypass plug 82 is a pair of continuous grooves or channels which extend in spaced, generally parallel relation to each other. Disposed within each of these grooves of the bypass plug 82 is a respective one of a pair of sealing members such as O-rings 98. The O-rings 98 are adapted to maintain a fluid tight seal between the outer surface of the bypass plug 82 and the complimentary surface of the first section 14 defining the opening through which the bypass plug 82 extends despite any movement of the bypass plug 82 relative to the first section 14. The movement of the bypass plug 82 from its closed position to any open position is facilitated by the selective manipulation of the above-described adjustment mechanism 84. The use of the bypass adjustment mechanism 80 will be described in more detail below as well.

As indicated above, in FIG. 2, the booster valve 10 is shown in its neutral, no pressure position wherein there is essentially no differential pressure between the signal and actuator chambers 56, 58 (i.e., the pressure level in the signal chamber 56 is substantially equal to the pressure level in the actuator chamber 58). When the booster valve 10 is in its neutral position, the lower spring 70 effectively biases the sealing surface 42 of the lower plug 80 into sealed engagement with the sealing surface 46 defined by the partition wall 44 of the second section 16. At the same time, the upper spring 68 effectively biases the sealing surface 36 defined by the hub portion 28 of the upper plug 26 against the complimentary sealing surface 40 defined by the lower plug 38. Assuming that the bypass plug 82 of the bypass adjustment mechanism 80 is in its closed position as shown in FIG. 2, the placement of the booster valve 10 into its neutral position facilitates the fluid isolation of the air supply chamber 48 (and hence the air supply port 54) from the actuator chamber 58 (and hence the actuator port 62) attributable to the sealed engagement of the sealing surfaces 42, 46 to each other. Additionally, the actuator chamber 58 is also fluidly isolated from the exhaust port 50 when the booster valve 10 is in its neutral position as a result of the sealed engagement between the sealing surfaces 36, 40. The signal chamber 56 (and hence the signal port 60)

is itself fluidly isolated from the actuator chamber 58 (and hence the actuator port 62) as a result of the bypass plug 82 of the bypass adjustment mechanism 80 being moved to its closed position, thus effectively blocking fluid communication between the signal chamber 56 and the actuator port 62 via the flow passage 92 of the sealing ring 86 and the bypass conduit 94. As will be recognized, the load of the lower spring 70 exceeds that of the upper spring 68, as is necessary to facilitate the sealed engagement between the sealing surfaces 42, 46 when the booster valve 10 is in its neutral position. In addition, the load on the upper spring 68 is variable since the spring retention collar 64 is effectively able to "float" within the complimentary recess defined by the first section 14 of the housing 12.

The introduction of pressurized air (or another pressurized fluid) into the signal chamber 56 via the signal port 60 in a manner facilitating an increase in the pressure level within the signal chamber 56 above the pressure level within the actuator chamber 58 (which is otherwise typically equal when the booster valve 10 is in the neutral position) facilitates the actuation of the booster valve 10 from its neutral position to the delivery position shown in FIG. 3. In this regard, an increase in the pressure level within the signal chamber 56 above that of the actuator chamber 58 results in such increased pressure within the signal chamber 56 acting on the flange portion 30 of the upper plug 26 in a manner driving the lower plug in a downward direction when viewed from the perspective shown in FIGS. 2 and 3. Due to the engagement of the sealing surface 36 of the upper plug 26 to the sealing surface 40 of the lower plug 38, such downward movement of the upper plug 26 facilitates the concurrent downward movement of the lower plug 38, assuming the pressure level within the signal chamber 56 and applied to the flange portion 30 of the upper plug 26 is sufficient to overcome the biasing force exerted against the lower plug 38 by the lower spring 70. The downward movement of the lower plug 38 attributable to the downward movement of the upper plug 26 effectively removes the sealing surface 42 of the lower plug 38 from its sealed engagement to the sealing surface 46 defined by the partition wall 44, thus creating an open flow passage between the outer surface of the lower plug 38 and the sealing surface 46 in the manner shown in FIG. 3. As a result of the creation of such flow passage, air (or another pressurized fluid) flowing into the air supply chamber 48 via the air supply port 54 is in turn free to flow into the actuator chamber 58 and thereafter into the actuator port 62 and outwardly toward an actuator fluidly coupled to the actuator port 62. However, the continued engagement of the sealing surface 36 of the upper plug 26 to the sealing surface 40 of the lower plug 38 prevents any air or other pressurized fluid from flowing from the actuator chamber 34 into the exhaust port 50 via the hollow interior of the lower plug 38. Once equilibrium is reached between the actuator chamber 58 and the signal chamber 56 as a result of the inflow of the air or another pressurized fluid into the actuator chamber 58 from the air supply chamber 48, the biasing force exerted against the lower plug 38 by the lower spring 70 facilitates the upward movement thereof in a manner facilitating the return of the sealing surface 42 into sealed engagement with the sealing surface 46, and hence the return of the booster valve 10 to its neutral position. As indicated above, the progressive downward movement or "opening" of the lower plug 38 is dependent on the preload and rating of the lower spring 70 which effectively undergoes a change in its working length during the actuation of the booster valve 10 from its neutral position to the delivery position. As a result, it is contemplated that by changing the preload and rating of the lower spring 70, it is possible to change the behavior of the booster valve 10 as it relates to its movement from the neutral position to the delivery position, without affecting its behavior as it relates to its movement to the exhaust position described in more detail below.

Importantly, when the booster valve 10 is in its delivery position, the pressurized air or other pressurized fluid within the signal chamber 56 is prevented from flowing through the passage 76 of the upper plug 26 and thereafter into the exhaust port 50 via the interior of the lower plug 38 as a result of the seal between the stem 72 and the upper plug 26 created by the above-described seal packing 78. The pressurized air or other pressurized fluid within the signal chamber 56 is also prevented from migrating into the actuator chamber 58 between the flange portion 30 of the upper plug 26 and the inner wall 24 of the second section 16 of the housing 12 as a result of the inclusion of the above-described sealing members 34 within the flange portion 30.

A reduction in the fluid pressure level within the signal chamber 56 back to a pressure level equal to the pressure level within the actuator chamber 58 allows the biasing force of the lower spring 70 to effectively return the sealing surfaces 42, 46 into sealed engagement with each other, thus returning the booster valve 10 to its neutral position. Importantly, despite the stem 74 being rigidly attached to and extending between the support member 74 (which is itself rigidly attached to the lower plug 38) and the spring retention collar 64, the upward movement of the lower plug 38 back to the neutral position is accommodated by the "float" or movement of the spring retention collar 64 within the complimentary recess of the first section 14 of the housing 12.

In the booster valve 10, a reduction of the air or other fluid pressure level within the signal chamber 56 below that pressure level within the actuator chamber 58 facilitates the movement of the booster valve 10 to its discharge position as shown in FIG. 5. More particularly, when the air or other fluid pressure level within the signal chamber 56 falls below that within the actuator chamber 58, the upper plug 26 is caused to move upwardly when viewed from the perspective shown in FIGS. 2 and 5. However, as will be recognized by those of ordinary skill in the art, the upward movement of the upper plug 26 occurs only so long as the fluid pressure level in the actuation chamber 58 exceeds the fluid pressure level in the signal chamber 56 by a margin sufficient for the fluid pressure within the actuation chamber 58 to act against the flange portion 30 with a force sufficient to overcome the biasing force exerted by the upper spring 68 thereagainst, thus facilitating the effective compression of the upper spring 68.

As further seen in FIG. 5, despite the upward movement of the upper plug 26 when the booster valve 10 moves to its discharge position, the lower plug 38 is effectively prevented from such upward movement due to the continued engagement of the sealing surface 42 thereof against the sealing surface 46 of the second section 16 of the housing 12. As a result, the upward movement of the upper plug 26 without any corresponding upward movement of the lower plug 38 facilitates the separation of the sealing surfaces 36, 40 of the upper and lower plugs 26, 38 from each as also shown in FIG. 5. The disengagement of the sealing surfaces 36, 40 from each other facilitates the creation of a flow path therebetween, thus placing the actuator chamber 58 into fluid communication with the exhaust port 50 via the hollow interior of the lower plug 38 and the flow openings defined by the support member 74. Once equilibrium is reached between the actuator chamber 58 and the signal chamber 56 as a result of the exhausting of the actuator chamber 58, the biasing force exerted against the upper plug 26 by the upper spring 68 facilitates the downward movement thereof in a manner facilitating the return of the sealing surface 36 into sealed engagement with the sealing surface 40, and hence the return of the booster valve 10 to its neutral position. As indicated above, the progressive upward movement or "opening" of the upper plug 26 is dependent on the preload and rating of the upper spring 68 which effectively undergoes a change in its working length during the actuation of the booster valve 10 from its neutral position to the exhaust position. As a result, it is contemplated that by changing the preload and rating of the upper spring 68, it is possible to change the behavior of the booster valve 10 as it relates to its movement from the neutral position to the discharge position, without affecting its behavior as it relates to its movement to the delivery position described above.

In the booster valve 10, the inclusion of the aforementioned bypass adjustment mechanism 80 including the bypass plug 82 and bypass conduit 94 makes it possible to allow some flow to go from the signal chamber 56 to the actuator chamber 58 in the above-described manner. This particular functionality avoids the booster valve 10 always being fired for small positioner steps, thus increasing the stability of any actuator operatively coupled to the booster valve 10. In the booster valve 10, it is contemplated that the bypass plug 82 and sealing ring 86 may be selectively changed out in order to provide optimal adjustability for the different flow coefficients (Cv's) of different positioners with which the booster valve 10 may be used. As indicated above, those of ordinary skill in the art will recognize that the booster valve 10, though typically being operative in conjunction with the use of pressurized air, may also be operated in conjunction with the use of pressurized fluid other than for air without departing from the spirit and scope of the present invention.

This disclosure provides exemplary embodiments of the present invention. The scope of the present invention is not limited by these exemplary embodiments. Numerous variations, whether explicitly provided for by the specification or implied by the specification, such as variations in structure, dimension, type of material and manufacturing process may be implemented by one of skill in the art in view of this disclosure. For example, it is contemplated that the flange portion 30 of the upper plug 26 may comprise a diaphragm rather than the piston-like structure described above, the peripheral portion of such diaphragm being captured between the first and second sections 14, 16 of the housing 12, and fluidly isolating the signal and actuator chambers 56, 58 from each other. Further, it is contemplated that a device may be integrated into the booster valve 10 which allows for the separate adjustability of the preloads of the upper and lower springs 68, 70 in order to independently calibrate the behavior or performance characteristics of the booster valve 10 as it moves between its neutral, delivery and discharge positions. Still further, it is contemplated that the exhaust port 50 may be fluidly connected to a muffler, silencer or a flanged pipe to capture the discharged gas.

What is claimed is:

1. A booster valve, comprising:
a housing having a signal port, an actuator port, a supply port, and an exhaust port disposed therein;
an upper plug disposed within the housing;
a lower plug disposed within the housing, the upper plug, the lower plug and the housing collectively defining a signal chamber which fluidly communicates with the signal port, an actuator chamber which fluidly communicates with the actuator port, and a supply chamber which fluidly communicates with the supply port; and
an elongate stem extending through at least portions of each of the upper and lower plugs, the stem being rigidly attached to the lower plug and slidably attached to the upper plug;
the upper and lower plugs being selectively movable between:
a neutral position wherein the actuator chamber is fluidly isolated from both the supply chamber and the exhaust port;
a delivery position wherein the actuator chamber fluidly communicates with the supply chamber but is fluidly isolated from the exhaust port; and
a discharge position wherein the actuator chamber fluidly communicates with the exhaust port but is fluidly isolated from the supply chamber.

2. The booster valve of claim 1 wherein:
the housing defines an internal housing sealing surface;
the upper plug defines an upper plug sealing surface;
the lower plug defines first and second lower plug sealing surfaces;
the upper plug sealing surface is disposed in sealed engagement with the first lower plug sealing surface, and the second lower plug sealing surface is disposed in sealed engagement with the housing sealing surface when the upper and lower plugs are in the neutral position;
the upper plug sealing surface is disposed in sealed engagement with the first lower plug sealing surface, and the second lower plug sealing surface is separated from the housing sealing surface when the upper and lower plugs are in the delivery position; and
the upper plug sealing surface is separated from the first lower plug sealing surface, and the second lower plug sealing surface is disposed in sealed engagement with the housing sealing surface when the upper and lower plugs are in the discharge position.

3. The booster valve of claim 2 wherein the upper plug comprises:
a tubular huh portion defining the upper plug sealing surface; and
a flange portion which extends radially outward from the hub portion;
the upper plug being sized and configured to separate the signal chamber from the actuator chamber within the housing.

4. The booster valve of claim 3 wherein the lower plug has a tubular configuration, and includes a first end portion which defines the first lower plug sealing surface, a second end portion which partially resides within and fluidly communicates with the exhaust port, and an outer surface, a portion of which defines the second lower plug sealing surface.

5. The booster valve of claim of 1 further comprising:
an upper spring cooperatively engaged to an extending between the housing and the upper plug; and
a lower spring cooperatively engaged to and extending between the housing and the lower plug;
the upper and lower springs being operative to normally bias the upper and lower plugs to the neutral position.

6. The booster valve of claim 5 the upper spring is sized and configured to normally exert an upper spring load of the upper plug, and the lower spring is sized and configured to normally exert a lower spring load on the lower plug which exceeds the upper spring load.

7. The booster valve of claim 5 further comprising a spring retention collar moveably attached to the housing, the upper spring being cooperatively engaged to and extending between the spring retention collar and the upper plug.

8. The booster valve of claim 7 wherein the stem has a first end portion attached to the spring retention collar and a second end portion attached to the lower plug.

9. The booster valve of claim 8 wherein the lower plug has a hollow, tubular configuration and defines an inner surface, and the second end portion of the stem is attached to a support member which is disposed within the lower plug and mounted to the inner surface thereof.

10. The booster valve of claim 8 wherein the upper plug is slidably mounted to the stem and reciprocally movable therealong.

11. The booster valve of claim 1, further comprising a bypass adjustment mechanism operative to selectively place the signal chamber into fluid communication with the actuator chamber.

12. The booster valve of claim 11 wherein the bypass adjustment mechanism comprises:
   a bypass conduit disposed within the housing and fluidly communicating with the actuator port;
   a sealing ring disposed within the signal chamber, the sealing ring defining a flow passage which fluidly communicates with the bypass conduit and a ring sealing surface which circumvents one end of the flow passage; and
   a bypass plug defining a plug sealing surface;
   the bypass plug being attached to the housing and selectively movable between a closed position wherein the plug sealing surface is disposed in sealed engagement to the ring sealing surface in a manner fluidly isolating the signal chamber from the actuator port, and an open position wherein the plug sealing surface is separated from the ring sealing surface in a manner facilitating the placement of the signal chamber into fluid communication with the actuator port.

13. A booster valve, comprising:
   a housing having a signal chamber, an actuator chamber, a supply chamber, and an exhaust port disposed therein;
   an upper plug and a lower plug which are each disposed within the housing; and
   an elongate stem extending through at least portions of each of the upper and lower plugs, the stem being rigidly attached to the lower plug and slidably attached to the upper plug;
   the upper and lower plugs being selectively movable relative to the housing either concurrently or independently relative to each other between:
      a neutral position wherein the actuator chamber is fluidly isolated from both the supply chamber and the exhaust port;
      a delivery position wherein the actuator chamber fluidly communicates with the supply chamber but is fluidly isolated from the exhaust port; and
      a discharge position wherein the actuator chamber fluidly communicates with the exhaust port but is fluidly isolated from the supply chamber.

14. The booster valve of claim 13 wherein:
   the housing defines an internal housing sealing surface;
   the upper plug defines an upper plug sealing surface;
   the lower plug defines first and second lower plug sealing surfaces;
   the upper plug sealing surface is disposed in sealed engagement with the first lower plug sealing surface, and the second lower plug sealing surface is disposed in sealed engagement with the housing sealing surface when the upper and lower plugs are in the neutral position;
   the upper plug sealing surface is disposed in sealed engagement with the first lower plug sealing surface, and the second lower plug sealing surface is separated from the housing sealing surface when the upper and lower plugs are in the delivery position; and
   the upper plug sealing surface is separated from the first lower plug sealing surface, and the second lower plug sealing surface is disposed in sealed engagement with the housing sealing surface when the upper and lower plugs are in the discharge position.

15. The booster valve of claim 14 wherein the upper plug comprises:
   a tubular hub portion defining the upper plug sealing surface; and
   a flange portion which extends radially outward from the hub portion;
   the upper plug being sized and configured to separate the signal chamber from the actuator chamber within the housing.

16. The booster valve of claim 15 wherein the lower plug has a tubular configuration, and includes a first end portion which defines the first lower plug sealing surface, a second end portion which partially resides within and fluidly communicates with the exhaust port, and an outer surface, a portion of which defines the second lower plug sealing surface.

17. The booster valve of claim of 13 further comprising:
   an upper spring cooperatively engaged to an extending between the housing and the upper plug; and
   a lower spring cooperatively engaged to and extending between the housing and the lower plug;
   the upper and lower springs being operative to normally bias the upper and lower plugs to the neutral position.

18. The booster valve of claim 17 further comprising a spring retention collar moveably attached to the housing, the upper spring being cooperatively engaged to and extending between the spring retention collar and the upper plug.

19. The booster valve of claim 18 wherein the stem has a first end portion attached to the spring retention collar and a second end portion attached to the lower plug.

20. A booster valve, comprising:
   a housing having a signal chamber, an actuator chamber, a supply chamber, and an exhaust port disposed therein;
   an upper plug and a lower plug which are each disposed within the housing and are selectively movable relative to the housing either concurrently or independently relative to each other in a manner which is operative to place the actuator chamber into selective fluid communication with one of the supply chamber and the exhaust port;
   an elongate stem extending through at least portions of each of the upper and lower plugs, the stem being rigidly attached to the lower plug and slidably attached to the upper plug;
   an upper spring cooperatively engaged to an extending between the housing and the upper plug; and
   a lower spring cooperatively engaged to and extending between the housing and the lower plug;
   the upper and lower springs being operative to normally bias the upper and lower plugs to a neutral position wherein the actuator chamber is fluidly isolated from both the supply chamber and the exhaust port.

* * * * *